(12) United States Patent
Hwang et al.

(10) Patent No.: US 9,106,935 B2
(45) Date of Patent: Aug. 11, 2015

(54) METHOD AND APPARATUS FOR TRANSMITTING AND RECEIVING A CONTENT FILE INCLUDING MULTIPLE STREAMS

(75) Inventors: Seo-Young Hwang, Suwon-si (KR); Sung-Ryeul Rhyu, Yongin-si (KR); Jae-Yeon Song, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 13/042,018

(22) Filed: Mar. 7, 2011

(65) Prior Publication Data

US 2012/0005303 A1 Jan. 5, 2012

(30) Foreign Application Priority Data

Mar. 5, 2010 (KR) ........................ 10-2010-0020027

(51) Int. Cl.
*G06F 15/16* (2006.01)
*H04N 21/236* (2011.01)
*H04N 21/25* (2011.01)
*H04N 21/258* (2011.01)
(Continued)

(52) U.S. Cl.
CPC ..... *H04N 21/23614* (2013.01); *G06Q 30/0241* (2013.01); *H04N 21/251* (2013.01); *H04N 21/25891* (2013.01); *H04N 21/26258* (2013.01); *H04N 21/4348* (2013.01); *H04N 21/6543* (2013.01); *H04N 21/84* (2013.01); *H04N 21/8456* (2013.01); *H04N 21/85406* (2013.01); *H04N 21/812* (2013.01)

(58) Field of Classification Search
CPC .............. H04N 21/84; H04N 21/8456; H04N 21/4307; H04N 21/4334; H04N 21/8106; H04N 21/816; H04N 5/2171; H04N 5/232; H04N 13/0066; H04N 21/234327; H04N 21/23614; H04N 21/41407
USPC ........................................................ 709/217
See application file for complete search history.

(56) References Cited

U.S. PATENT DOCUMENTS

2003/0061369 A1 3/2003 Aksu et al.
2004/0158579 A1* 8/2004 Gopalakrishnan ......... 707/104.1
(Continued)

FOREIGN PATENT DOCUMENTS

CN 1755701 4/2006
CN 101647280 2/2010
(Continued)

OTHER PUBLICATIONS

International Standard, Information Technology—Coding of Audio-Visual Objects—Part 12: ISO Base Media File Format, ISO/IEC 14496-12, Second Edition, Oct. 1, 2005.
(Continued)

*Primary Examiner* — Douglas W Owens
*Assistant Examiner* — Monica C King
(74) *Attorney, Agent, or Firm* — The Farrell Law Firm, P.C.

(57) ABSTRACT

A method and apparatus is provided for transmitting and playing complex content including a plurality of content. A method of playing the complex content includes receiving, from a server, the complex content and classification information corresponding to the complex content, classifying the plurality of content according to the classification information, and playing the complex content based on the classified plurality of content.

14 Claims, 22 Drawing Sheets

(51) Int. Cl.
*H04N 21/262* (2011.01)
*H04N 21/434* (2011.01)
*H04N 21/6543* (2011.01)
*H04N 21/84* (2011.01)
*H04N 21/845* (2011.01)
*H04N 21/854* (2011.01)
*G06Q 30/02* (2012.01)
*H04N 21/81* (2011.01)

(56) References Cited

U.S. PATENT DOCUMENTS

| | | |
|---|---|---|
| 2006/0059245 A1* | 3/2006 | Toma et al. ............... 709/219 |
| 2006/0092938 A1* | 5/2006 | Gentrix ..................... 370/390 |
| 2006/0095974 A1 | 5/2006 | Ito et al. |
| 2007/0078954 A1* | 4/2007 | Seo ............................ 709/219 |
| 2007/0201832 A1* | 8/2007 | Date et al. ................. 386/95 |
| 2007/0260627 A1 | 11/2007 | Knittel et al. |
| 2008/0147700 A1 | 6/2008 | Doi |
| 2008/0304766 A1* | 12/2008 | Lee et al. ................... 382/276 |
| 2009/0157750 A1* | 6/2009 | Kim et al. ................. 707/104.1 |
| 2009/0199100 A1* | 8/2009 | Hwang et al. ............. 715/723 |
| 2009/0210896 A1* | 8/2009 | Song et al. ................ 725/32 |
| 2009/0284583 A1* | 11/2009 | Hwang et al. ............. 348/43 |
| 2010/0061699 A1* | 3/2010 | Kang et al. ................ 386/92 |
| 2010/0146018 A1 | 6/2010 | Kim |
| 2011/0219098 A1* | 9/2011 | Xu et al. .................... 709/219 |
| 2012/0002947 A1* | 1/2012 | Rhyu et al. ................ 386/248 |

FOREIGN PATENT DOCUMENTS

| | | |
|---|---|---|
| JP | 2003-297015 | 10/2003 |
| JP | 2004-040329 | 2/2004 |
| JP | 2004-312713 | 11/2004 |
| JP | 2005-504480 | 2/2005 |
| WO | WO 2008/091136 | 7/2008 |
| WO | WO 2008091136 A1 * | 7/2008 |

OTHER PUBLICATIONS

Chinese Office Action dated Jan. 16, 2015 issued in counterpart application No. 201180012492.0.

* cited by examiner

METHOD AND APPARATUS FOR TRANSMITTING AND RECEIVING A CONTENT FILE INCLUDING MULTIPLE STREAMS

PRIORITY

This application claims priority under 35 U.S.C. §119(a) to a Korean Patent Application filed in the Korean Intellectual Property Office on Mar. 5, 2010 and assigned Serial No. 10-2010-0020027, the entire disclosure of which is hereby incorporated by reference.

BACKGROUND OF THE INVENTION

1. Field of the Invention

The present invention relates generally to a method and apparatus for transmitting and receiving a content file, and more particularly, to a content file transmission and reception method and apparatus for providing semantic configuration and role information of content including a plurality of stream groups.

2. Description of the Related Art

Recently, with the expansion of digital content markets and the diversity of available platforms, there is an increasing demand for complex content rather than single type content. For example, a main service stream and an additional information stream such as an advertisement stream may constitute complex content by being created as one service object rather than individual streams.

The recently produced and distributed content is characterized in that the content can be produced and distributed in real time, can be reconfigured and redistributed, and can be controlled according to user preference. The recent content reflecting these characteristics includes, for example, free content that users can freely use, copy, change, and redistribute without any special restrictions, and open content allowing the users to share creations such as texts, videos, and music.

Using free content and open content, many different types of content may be created by different producers according to their purposes and intentions. For example, using source content A, B, and C, a service provider may create content in which the source content A is its main content, and may also create content in which the source content B or C is its main content. Accordingly, the utilization of content depends on semantic configurations and roles of various source streams constituting the content.

However, conventional content delivery and provision technology have limitations in providing content, taking into account the semantic configurations and roles of content, because the technology merely focuses on providing delivered content in predetermined sizes and shapes at predetermined times.

SUMMARY OF THE INVENTION

Accordingly, the present invention is designed to address at least the problems and/or disadvantages discussed above and to provide at least the advantages described below. An aspect of the present invention is to provide a method and apparatus for recording and playing content including a plurality of stream groups.

Another aspect of the present invention is to provide a content providing method and apparatus for enabling free adjustment and control of content by providing semantic configuration and role information of the provided content.

In accordance with an aspect of the present invention, a method for receiving a plurality of content is provided. The method includes acquiring classification information from a server; and classifying the plurality of content provided from the server according to the classification information.

In accordance with another aspect of the present invention, a method for transmitting a plurality of content is provided. The method includes providing classification information to a reception apparatus; and providing, to the reception apparatus, the plurality of content information, which is classifiable based on the classification information.

In accordance with another aspect of the present invention, an apparatus for receiving a plurality of content is provided. The apparatus includes a receiver for receiving classification information and the plurality of content from a server; and a processor for classifying the plurality of content according to the classification information.

In accordance with another aspect of the present invention, an apparatus for transmitting a plurality of content is provided. The apparatus includes a data processor for generating classification information; and a transmitter for transmitting, to a reception apparatus, the plurality of content, which is classifiable based on the classification information.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

Various embodiments of the present invention will now be described in detail with reference to the accompanying drawings. In the following description, specific details, such as detailed configuration and components, are merely provided to assist the overall understanding of certain embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 1:
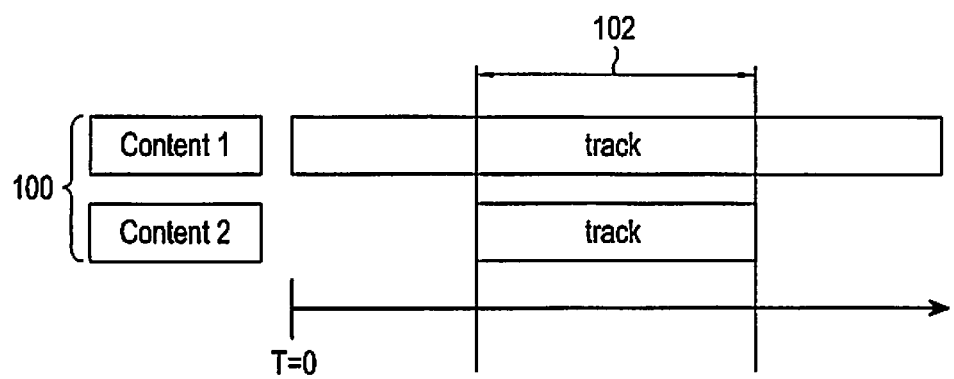
FIG. 1 is a diagram illustrating a content providing method for complex content including multiple content types when a plurality of content is provided in the same time period.

FIG. 1 is a diagram illustrating a content providing method for complex content including multiple content types when a plurality of content is provided in the same time period. Specifically, FIG. 1 illustrates a content providing method for complex content consisting of multiple content types 100, i.e., Content 1 and Content 2, which are to be provided in a same time period 102.

Referring to FIG. 1, because Content 1 and Content 2 are provided in the same time 102 or the same service time, a conventional (or legacy) player may not be able to determine how to render them. Especially, for unexpected content that is created and provided in real time, such as newsflashes or emergency messages, the conventional player has no way to control this content, taking into account the ongoing content.

Figure 2:
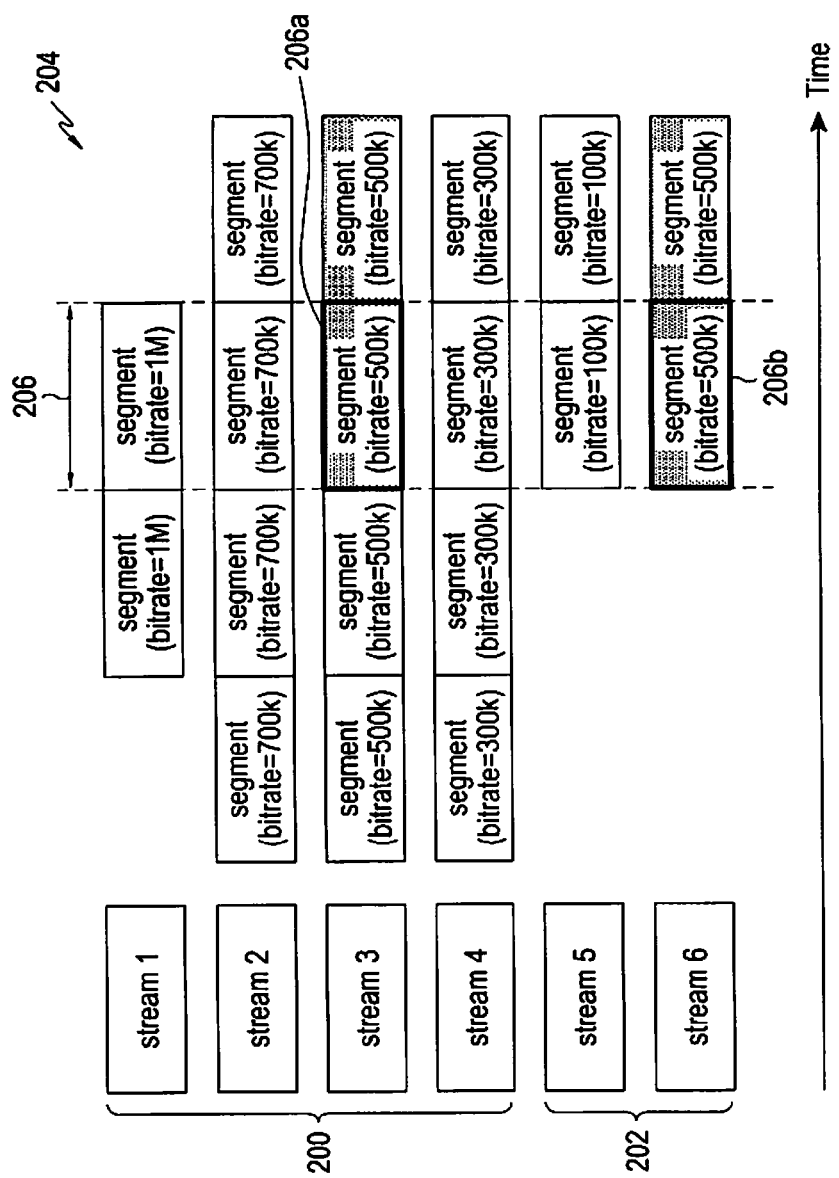
FIG. 2 is a diagram illustrating a service configuration for selecting an appropriate source stream from among a plurality of source streams according to a user environment and providing the selected stream to a user.

FIG. 2 is a diagram illustrating a service configuration for selecting an appropriate source stream from among a plurality of source streams according to a user environment and providing the selected stream to a user.

Referring to FIG. 2, it is assumed that streams 1, 2, 3, and 4 include associated segments of content A 200, and streams 5 and 6 include associated segments of content B 202, which together, constitute complex content. A user terminal that is to receive the segments located in a time period 206 can receive 500-Kbit data. In this case, the terminal may not determine whether it should select any one of or both of content A and content B for playback because the terminal has no information about the relationship between the contents A and B. Therefore, the terminal will merely select a data stream corresponding to a size of 500 Kbits, which is its possible capability. Even in this case, however, because there are multiple segments 206a and 206b being transmitted in 500-Kbps data streams, as illustrated in FIG. 2, the terminal may not determine which data stream or segment it should select and receive to provide the service to the user in the time period 206.

To address these and other disadvantages, a content providing method and apparatus in accordance with an embodiment of the present invention facilitate free adjustment and control of content according to various content types and user intentions by providing semantic configuration and role information of the content including stream groups consisting of a plurality of streams. These multiple streams may include additional streams that are generated and provided during service of main content. Herein, the terms "stream" and "content" will be used in the same meaning. Additionally, the streams or content may be transmitted in segments.

The information for content control, as will be described herein below, may be configured as a recording and delivery medium that stores and/or carries information. Although it will not be described herein in detail, the control information or the medium may be included in any data formats capable of recording, transmitting, delivering, and storing data.

Further, the complex content consisting of multiple source content types, as will be described herein below, may be configured as a logical object or an aggregate of streams, and an aggregate of complex source content may constitute one new content or object. Herein, the term "complex content" refers to an aggregate of multiple content types.

Figure 3:
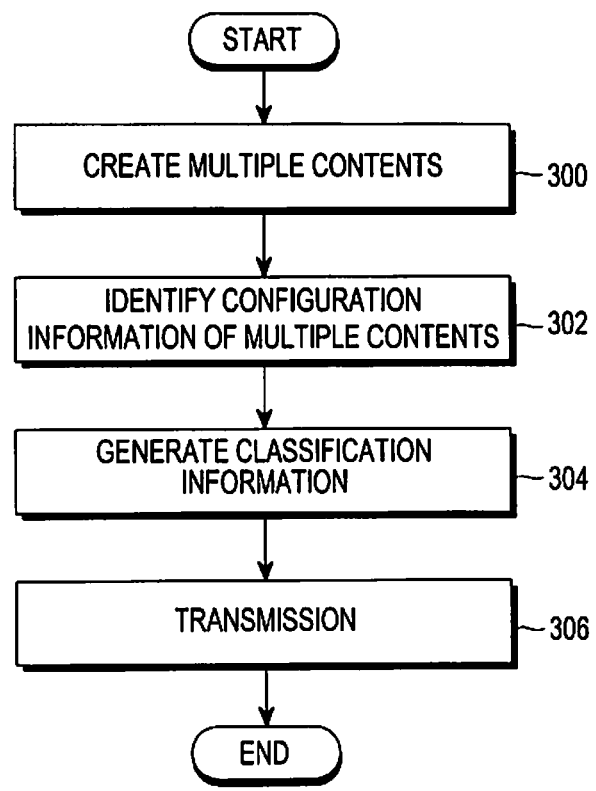
FIG. 3 is a flowchart illustrating a method for transmitting multiple content types according to an embodiment of the present invention.

FIG. 3 is a flowchart illustrating a method for transmitting multiple content types, i.e., complex content, according to an embodiment of the present invention.

Referring to FIG. 3, a server apparatus creates a plurality of content in step 300, and identifies configuration information between the multiple content types in step 302. Based on the identified configuration information, the server apparatus or a transmission apparatus generates classification information in step 304, and provides the plurality of content, i.e., complex content, and the classification information to a reception apparatus or a client apparatus in step 306.

Figure 4:
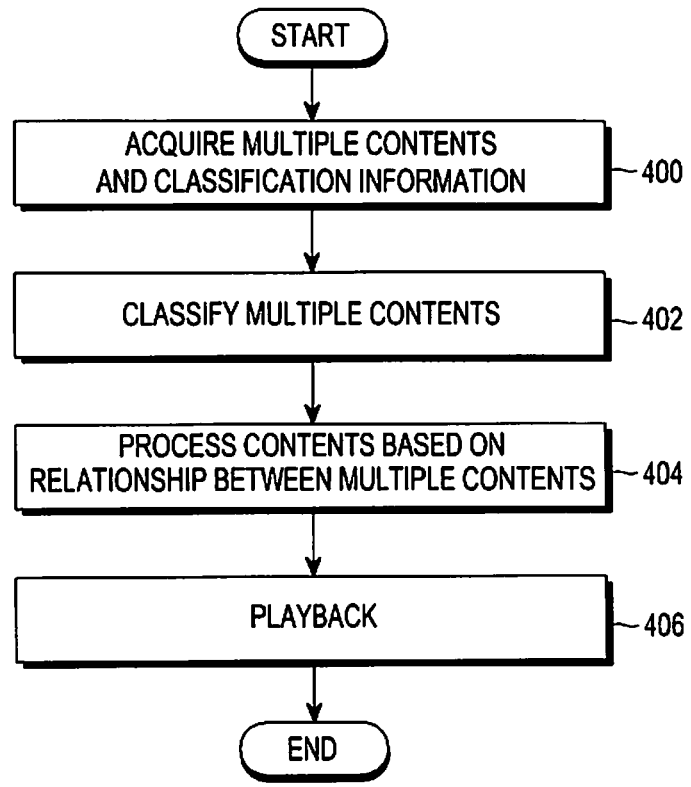
FIG. 4 is a flowchart illustrating a method for receiving multiple content types according to an embodiment of the present invention.

FIG. 4 is a flowchart illustrating a method for receiving complex content according to an embodiment of the present invention.

Referring to FIG. 4, a player or a client apparatus acquires complex content, which includes multiple content types, and acquires classification information for the complex content from a server apparatus in step 400. The client apparatus may acquire the complex content and classification information from the server apparatus by first sending a request to the server apparatus, or may receive them from the server apparatus without a request.

After receiving the complex content and classification information, the client apparatus classifies the multiple content types depending on the classification information in step 402, and processes the complex content according to the relationship between the identified multiple content types in step 404. In step 404, depending on the relationship between the multiple content types, the client apparatus may determine which content is main content and which content is additional content, and may also determine the number of additional content among the multiple content types. Based on the relationship between the identified multiple content types, the client apparatus may process the main content and additional content independently.

For example, if the additional content is about an emergency broadcast, the client apparatus may provide the additional content about the emergency broadcast while playing the main content. However, if the additional content is an advertisement, the client apparatus may provide the additional content in the middle of the main content, or after the main content is completed. In step 406, the client apparatus plays the complex content.

Figure 5:
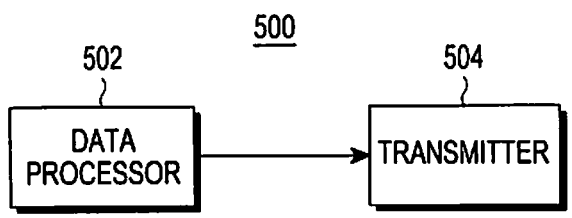
FIG. 5 is a block diagram illustrating a server apparatus according to an embodiment of the present invention.

FIG. 5 is a block diagram illustrating a server apparatus 500 according to an embodiment of the present invention.

Referring to FIG. 5, a data processor 502 generates classification information, i.e., information for classifying or identifying multiple content types. A transmitter 504 transmits the classification information and the associated complex content to a client apparatus.

Figure 6:
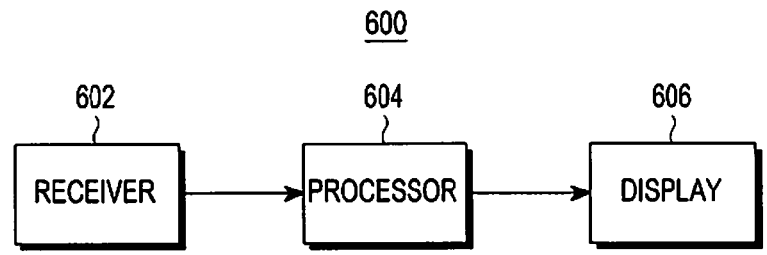
FIG. 6 is a block diagram illustrating a client apparatus for receiving multiple content types according to an embodiment of the present invention.

FIG. 6 is a block diagram illustrating a client apparatus for receiving complex content according to an embodiment of the present invention.

Referring to FIG. 6, the client apparatus 600 includes a receiver 602 that receives classification information and associated complex content from a server apparatus. A processor 604 classifies multiple content types included in the complex content using the classification information, and provides content to a user on a display 606. The processor 604 may identify a relationship between individual content among the multiple content types using the classification information, distinguish between main content and additional content depending on the identified relationship, and appropriately output the individual content on the display 606.

FIGS. 7 to 11 illustrate complex content structures according to an embodiment of the present invention.

Figure 7:
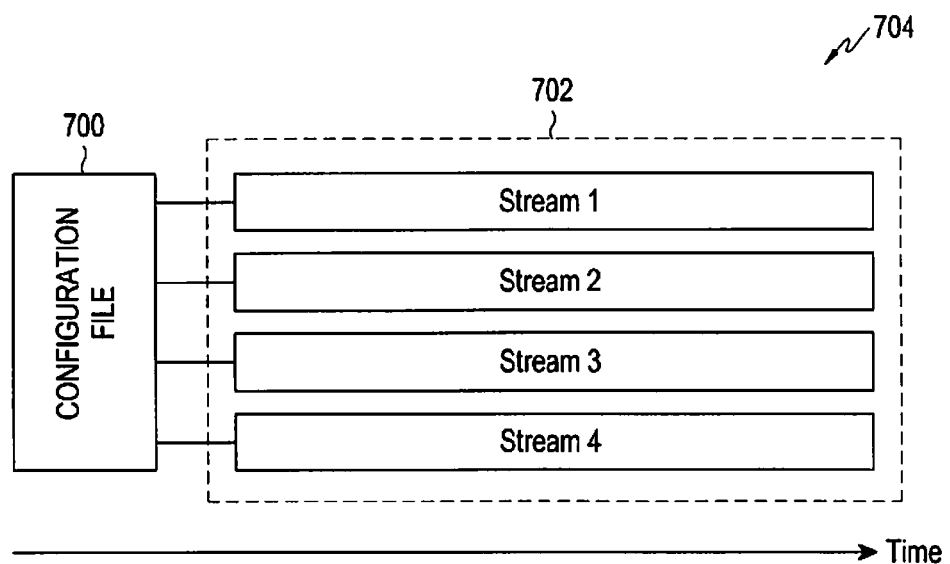
FIGS. 7 to 11 illustrates complex content structures according to an embodiment of the present invention.
Figure 8:
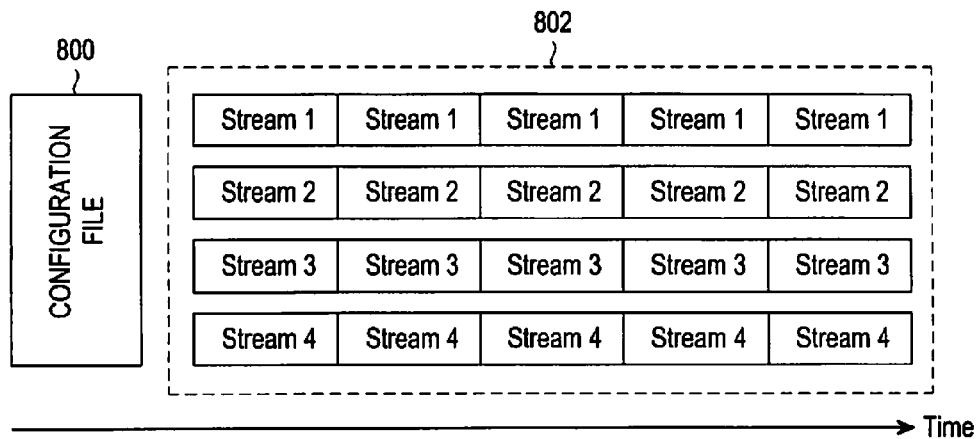

Referring to FIGS. 7 and 8, a complex content structure 704 includes a configuration file 700 and complex content 702 including multiple streams or multiple content types. Accordingly, a receiving terminal (or client terminal) may identify information about the complex content 702 and 802 by receiving and checking the configuration files 700 and 800, respectively, in advance.

Figure 9:
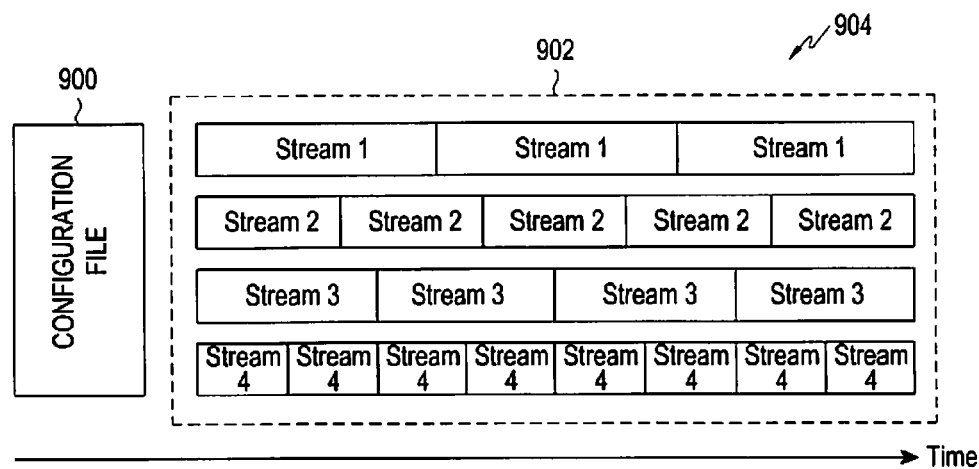
Figure 10:
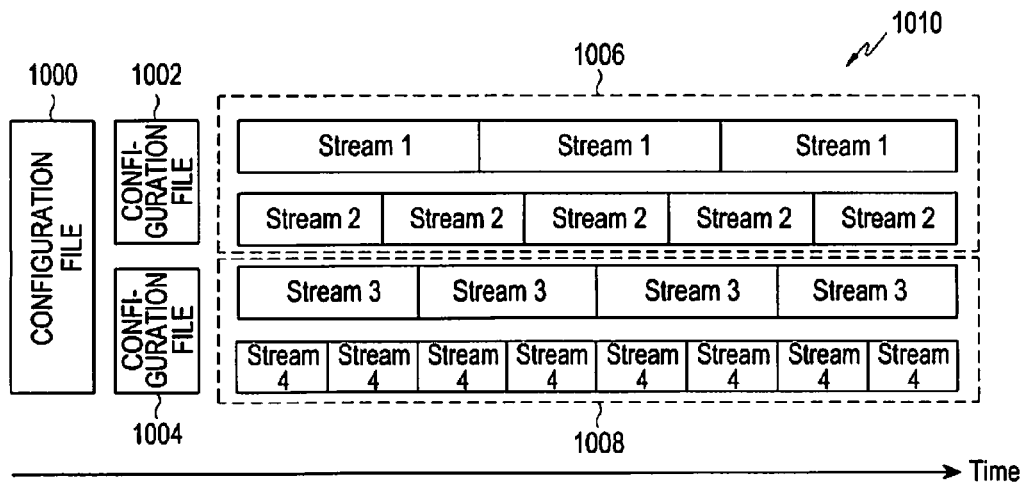
Figure 11:
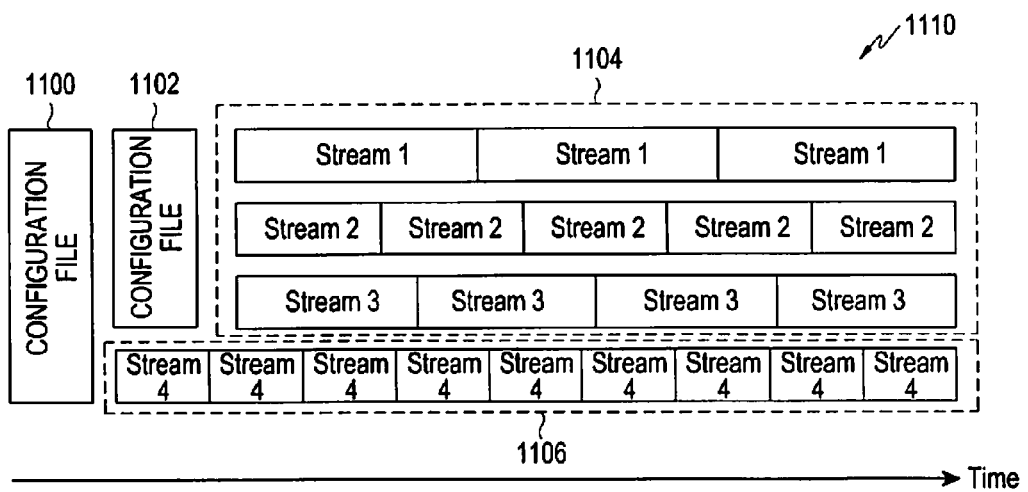

FIGS. 9 to 11 illustrate complex content structures according to an embodiment of the present invention.

Referring to FIGS. 9 to 11, complex content 902, 1006, 1008, 1104, and 1106 may be different according to their streams or content in terms of a unit/size in which the streams or content are transmitted/received.

The complex content described herein may be configured as an aggregate of multiple complex content 1006 and 1008, as illustrated in FIG. 10, or may be configured as an aggregate of complex content 1104 and source content or source stream 1106, as illustrated in FIG. 11.

More specifically, referring to FIG. 9. a configuration file 900 includes information about the complex content 902 including multiple streams, and a reception apparatus identifies semantic configuration and role information of the streams by checking the configuration file 900. In accordance with an embodiment of the present invention, the configuration file 900 includes classification information for classifying the multiple streams, i.e., content types, included in the complex content 902.

Referring to FIG. 10, a complex content structure 1010 includes a hierarchical structure. For example, an upper-level (or upper-layer) configuration file 1000 has two lower-level configuration files 1002 and 1004, which include classification information for their associated complex content 1006 and 1008, respectively. Upon receiving the complex content structure 1010, a reception apparatus first analyzes the upper-level configuration file 1000, identifies the configuration files 1002 and 1004 existing in a lower level of the configuration file 1000 as a result of the analysis, and then classifies complex content 1006 and 1008 according to the classification information of the identified configuration files 1002 and 1004, respectively. If the upper-level configuration file 1000 has the configuration files 1002 and 1004 in its lower level as in FIG. 10, then the upper-level configuration file 1000 has reference information for its lower-level configuration files 1002 and 1004 as well.

Referring to FIG. 11, a complex content structure 1110 includes an upper-level configuration file 1100 having information about its lower-level configuration file 1102 and information about the source streams 1106. Upon receiving the complex content structure 1110, a reception apparatus analyzes the configuration file 1100, and processes the complex content 1106 by checking the lower-level configuration file 1102 according to the classification information or reference information included in the configuration file 1100, or processes the source streams 1106 by directly checking a configuration of the source streams 1106.

The configuration files 700, 800, 900, 1000, and 1100, as described above, providing information, such as information provision for services and setting/initialization, and may be Media Presentation Descriptions (MPDs), manifests, configurations, etc. Additionally, any information having the same meaning or the same role may be determined as the same information as the configuration information.

Although basic field and attribute information have been or will be provided in this specification, configuration file information described in each embodiment of the present invention may further include additional information, such as fields and attributes according to the environments and/or services in use, but it is not intended to limit the scope of the present invention.

Additionally, while logical semantics of information included in the configuration file are illustrated and described in this specification, they may be represented in various information representation structures or formats such as eXtensible Markup Language (XML), binary data, formatted information structures, according to the system, and service production or provision environments.

Figure 12:
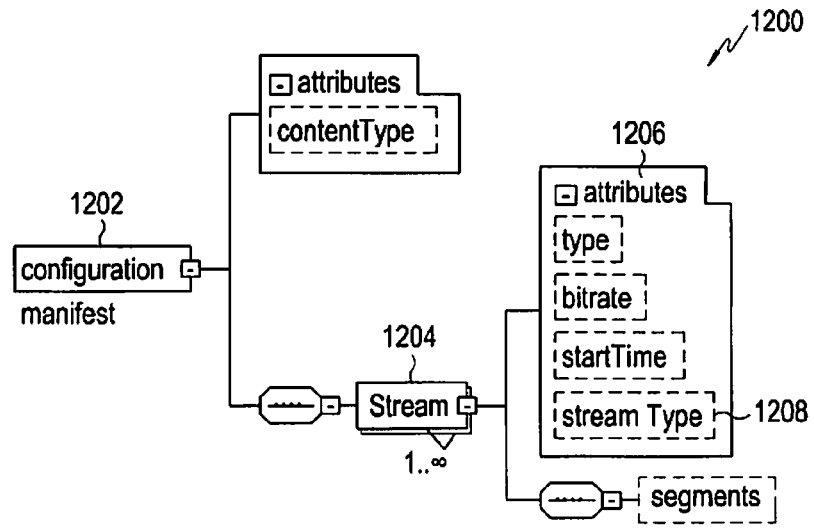
FIG. 12 is a diagram illustrating a configuration file according to an embodiment of the present invention.

FIG. 12 is a diagram illustrating a configuration file according to an embodiment of the present invention.

Referring to FIG. 12, the configuration file 1200 includes a top-level element 1202 having elements 1204 representing information about complex content, i.e., multiple streams, in its lower level. Detailed information about each stream may be identified by an attribute field 1206. As to the stream transmission or provision unit, detailed information about each provision unit may be provided by the attribute field 1206 according to the system or service production and provision environments.

In FIG. 12, a new element or a stream type (streamType) 1208 is added in the attribute field 1206 of the stream element 1204 in order to provide semantic configuration and role information of streams to information in the configuration file 1200. The stream type (streamType) 1208 represents its role or importance in the content, or a role of the stream itself. The stream type (streamType) 1208, as in the example of Table 1 below, may provide information indicating that a stream is a main service in the content provision. The other attributes illustrated in FIG. 12, i.e., type, bitrate, and StartTime, are not directly related to the present invention, so a description thereof will be omitted.

Table 1 shows an example of the stream type (streamType) 1208 indicating whether the stream is a main service/content stream or an additional content stream of the content according to an embodiment of the present invention.

TABLE 1

| value | streamType |
|-------|------------|
| 0x01  | main       |
| 0x02  | additional |
| 0x03  | Reserved   |

The stream type (streamType) 1208 may also describe a role of the content stream in detail, as shown in the example of Table 2. Table 2 shows an example of the stream type (streamType) 1208 indicating whether the stream is a content stream for an emergency message service, a stream for an advertisement, or a user-defined stream.

TABLE 2

| value | streamType    |
|-------|---------------|
| 0x01  | emergency     |
| 0x02  | advertisement |
| 0x03  | user defined  |
| 0x04  | reserved      |

Figure 13:
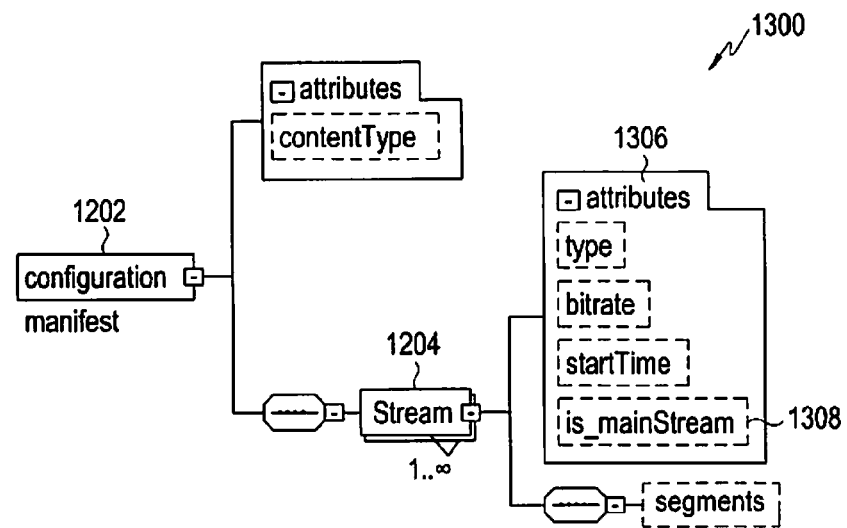
FIG. 13 is a diagram illustrating a configuration file structure for providing semantic configuration and role information of streams according to an embodiment of the present invention.

FIG. 13 illustrates a configuration file structure 1300 for providing semantic configuration and role information of streams according to an embodiment of the present invention. However, unlike in FIG. 12, in FIG. 13, an attribute field 1306 of the stream element 1204 includes an "is_mainStream" attribute element 1308.

Referring to FIG. 13, information provided by the "is_mainStream" element 1308 has the same meaning as the "streamType" element 1208 described in conjunction with FIG. 12. If a value of the "is_mainStream" element 1308 in FIG. 13 is set as "true", it indicates that the stream is a main service/content stream in the service provided. As another example, by setting an "emergency" field (not shown) as "true", it may be used to indicate that the content stream plays a role of an emergency message.

In accordance with another embodiment of the present invention for providing semantic configuration and role information of complex content, an example of configuring a complex content structure including multiple streams or multiple content types in one file or formatted content storage format will be described below. In the following description, examples of a complex content structure including multiple content types/streams will be described according to the International Organization for Standardization (ISO)-based file format.

The ISO-based media file format is defined in "Information technology-coding of audio-visual objects—part 12: ISO base media file format" of the ISO/IEC international standard 14496-12:2005. A file in this format includes media data of streams and metadata including information for playing the streams. A basic building block in the ISO-based media file format is called a "box", and the box is an objected-oriented basic building block in the ISO-based media file format. Each box includes a header and a payload. A header represents a type of the box and a size of the box in bytes. A plurality of specified boxes are derived from a "full box" structure including a version number and a flag in the header. A box may include another box, and the ISO file format designates types of boxes allowable in specific types of boxes.

Media data of a stream is stored in a media data (mdat) box as an Audio/Video (A/V) file, metadata thereof is stored in a MOOV box, and a file type thereof is stored in a file type (ftyp) box. Accordingly, the ISO-based media file format includes a plurality of boxes including A/V data and detailed information about the A/V data. In this specification, the term "box" may also be referred to as a "data block" or a "container".

Figure 14:
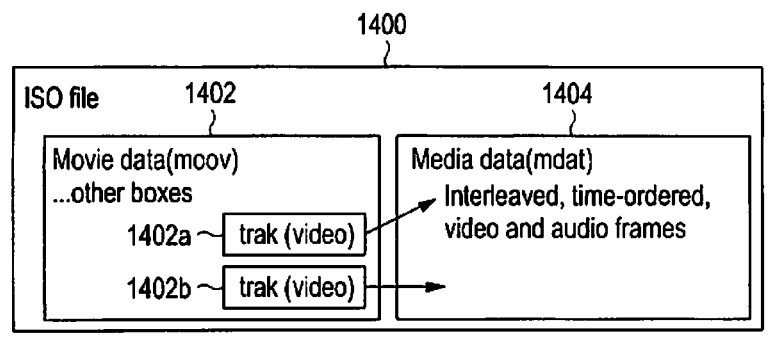
FIG. 14 is a diagram illustrating a conventional content storage format based on an International Organization for Standardization (ISO)-based media file format.

A more detailed description of the ISO-based media file format will be omitted so as not to obscure the subject matter of the present invention. FIG. 14 illustrates a conventional content storage format based on an ISO-based media file format. Although not illustrated in FIG. 14, a file type (ftyp) box includes information about a file type and a compatible file type. The compatible file type makes normal playback possible in a decoder.

Referring to FIG. 14, data in a MOOV box 1402 is configured in an object-based structure, and includes content information such as a frame rate, a bit rate, and an image size; synchronization (sync) information for supporting playback functions such as Fast forward (FF)/rewind (REW); and detailed information for playing a media file included in an mdat box 1404. Because the MOOV box 1402 includes information about a total number of A/V data frames and a size of each frame, a client apparatus may provide A/V data included in the mdat box 1404 by parsing the MOOV box 1402 during playback.

The MOOV box 1402 includes track (trak) boxes 1402*a* and 1402*b* for referencing streams that are recorded in the mdat box 1404 on a track basis.

The mdat box 1404 includes actual stream data corresponding to each track, and A/V data may be stored in the mdat box 1404 on a unit data basis, such as a frame and a sample.

Although the ISO/IEC 14496-12 standard-based media file format illustrated in FIG. 14 has been considered so far by way of example, the complex content structure described in the present invention may be used in any ISO/International Electrotechnical Commission (IEC) 14496-12 standard-based file formats. In addition, the complex content structure may be applied to any available storage formats and recording media that are configured in the structured format, though not based on the ISO/IEC 14496-12 standard.

Figure 15:
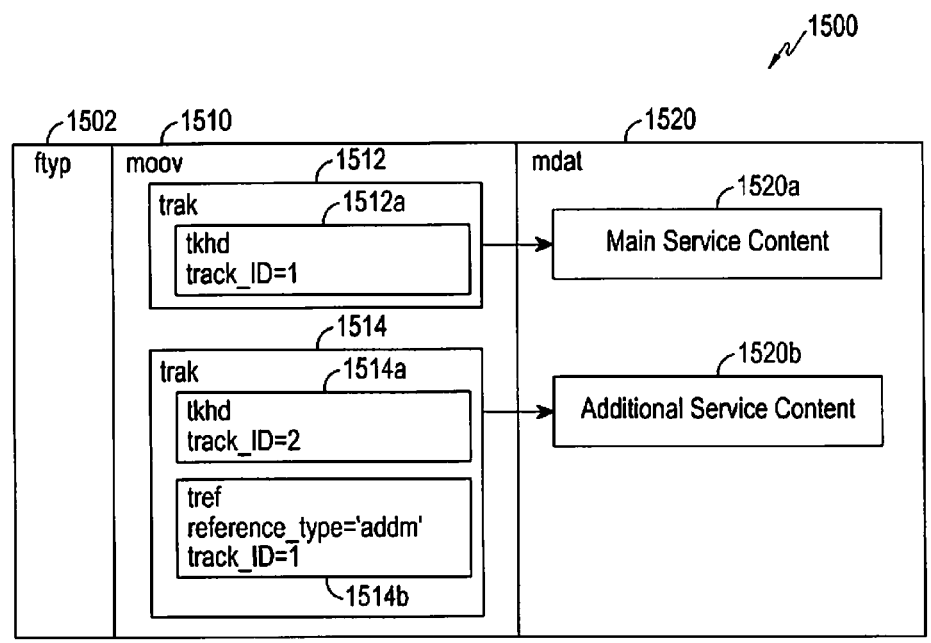
FIG. 15 is a diagram illustrating a storage format including information for providing semantic configuration and role information of streams constituting content according to an embodiment of the present invention.
Figure 17:
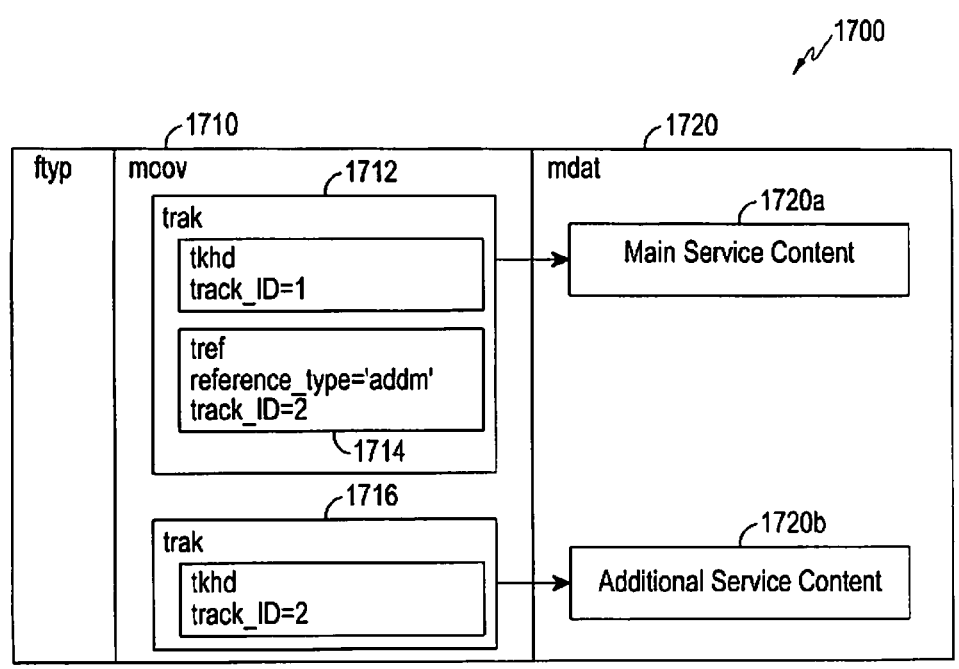
FIG. 17 is a diagram illustrating a storage format including information for providing semantic configuration and role information of streams constituting content according to an embodiment of the present invention.

FIGS. 15 and 17 illustrate storage formats including information for providing semantic configuration and role information of streams constituting content according to embodiments of the present invention.

Each of storage formats 1500 and 1700 illustrated in FIGS. 15 and 17 includes a main content stream of a service and an additional content stream thereof, such as an advertisement or an emergency message, in one storage format. Herein, the storage format may also be referred to as a complex content structure.

In FIGS. 15 and 17, to provide semantic configuration and role information of streams, an additional media track (addm) is newly defined as "handler_type" of a reference type (reference_type) indicating reference information of each track as in Table 3.

TABLE 3

| handler_type | Description |
|---|---|
| vide | video track |
| soun | audio track |
| hint | hint track |
| meta | timed metadata track |
| addm | additional media track |

The reference type (reference_type) is information included in track reference (tref) boxes 1514b and 1714, and the tref boxes 1514b and 1714 may be used to connect with other tracks that the current tracks reference, or by which the current tracks are referenced, using the reference type (reference_type) and track IDs (track_ID). Therefore, by checking the reference type (reference_type) of the tref box in the complex content structure storage format according to an embodiment of the present invention, a client apparatus may determine that the track that the current track will reference, or by which the current track is referenced, is an additional media track (addm), i.e., a track including content other than the main service, e.g., an emergency message service or an advertisement.

More specifically, referring to FIG. 15, the complex content structure storage format 1500 includes a MOOV box 1510 with two track (trak) boxes 1512 and 1514, which designate main service content 1520a and additional service content 1520b included in a mdat box 1520, respectively. The track (trak) boxes 1512 and 1514 include track header (tkhd) boxes 1512a and 1514a, respectively, and the tkhd boxes 1512a and 1514a include track IDentifiers (Ids) for identifying their associated tracks 1520a and 1520b included in the mdat box 1520, respectively.

In FIG. 15, the track reference box 1514b including information for referencing the additional service content 1520b is included in the track (trak) box 1514 corresponding to the additional service content 1520b. The track reference box 1514b includes a reference type (reference_type) and a track ID. The client apparatus checks the reference type (reference_type) included in the track reference box 1514b, and if the reference type (reference_type) is set as "addm", the client apparatus determines that the track 1520b corresponding to the track (trak) box 1514 and including additional service content is additional content.

Figure 16:
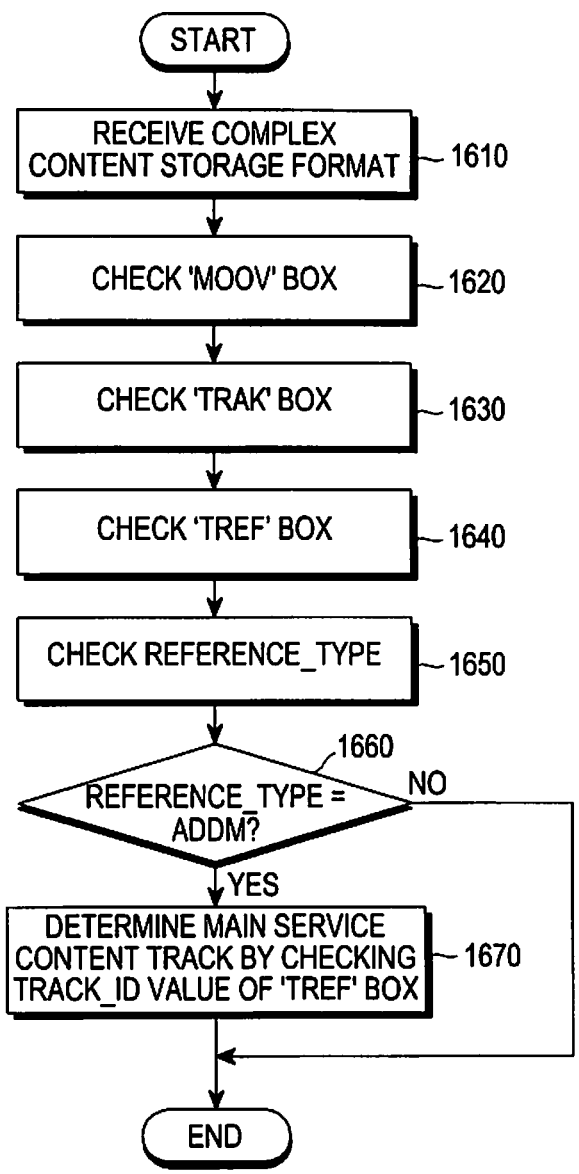
FIG. 16 is a flowchart illustrating a method for receiving a complex content storage format according to an embodiment of the present invention.

FIG. 16 is a flowchart illustrating an operational method of a terminal receiving a complex content storage format, as illustrated in FIG. 15, according to an embodiment of the present invention.

Referring to FIG. 16, a terminal receives the complex content storage format 1500 in step 1610, and checks the MOOV box 1510 in step 1620. Although not illustrated in FIG. 16, a process of analyzing and checking a box to be analyzed in the storage format, such as the file type (ftyp) box 1502, may be performed before step 1620. The terminal checks the track (trak) boxes 1512 and 1514 in a lower level in step 1630, and checks the presence/absence of the track reference (tref) box 1514b in step 1640. For the track with the track reference (tref) box 1514b, the terminal checks the track reference (tref) box 1514b in step 1640.

The terminal checks a reference type (reference_type) of the track reference (tree box 1514b in step 1650, and determines in step 1660 whether a value of the reference type (reference_type) is "addm". If a value of the reference type (reference_type) is "addm", this indicates that the track is a track including content other than the main service, such as an emergency message service or an advertisement. Accordingly, the terminal may determine which type of track the track containing the main service content is, by checking a value of the track_ID field of the track reference (tree box 1514b in step 1670. All steps succeeding step 1630 of checking the track (trak) boxes may be repeated from the first track to the last track of the image file.

Although the process of checking boxes is included in the description of operations of all terminals, the order of checking the boxes should not necessarily follow the order in the drawing. The file format analysis process and its associated terminal operation, which have not been described herein in detail, may follow details in the ISO/IEC 14496-12 standard.

Referring again to FIG. 17, the complex content structure storage format 1700 includes a MOOV box 1710 with track (trak) boxes 1712 and 1716, which designate main service content 1720a and additional service content 1720b included in an mdat box 1720, respectively. The track (trak) boxes 1712 and 1716 include their associated track header (tkhd) boxes, respectively.

A track reference (tref) box 1714 included in the track (trak) box 1712 corresponding to the main service content 1720a includes a reference type (reference_type) and a track identifier (track_ID). The client apparatus checks the reference type (reference_type) included in the track reference (tref) box 1714, and if the reference type (reference_type) is set as "addm", the client apparatus determines that the track corresponding to the track (trak) box 1712 is a track including the main service content 1720a.

Figure 18:
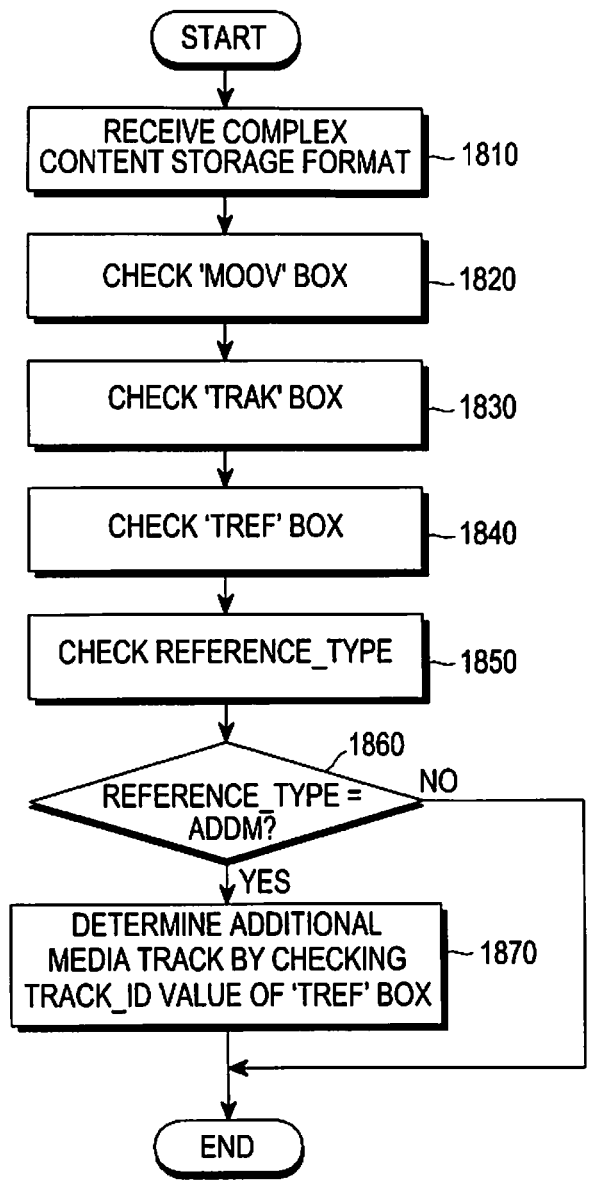
FIG. 18 is a flowchart illustrating a method for receiving a complex content storage format according to an embodiment of the present invention.

FIG. 18 is a flow chart illustrating an operational method of a terminal receiving a complex content storage format, as illustrated in FIG. 17, according to an embodiment of the present invention.

Referring to FIG. 18, a terminal receives a complex content storage format 1700 in step 1810, and checks a MOOV box 1710 in step 1820. Although not illustrated in FIG. 18, a process of analyzing and checking a box to be analyzed in the storage format 1700, such as the file type (ftyp) box, may be performed before step 1820. The terminal checks the track (trak) boxes 1712 and 1716 in a lower level in step 1830, and checks the presence/absence of the track reference (tref) box 1714 in step 1840. For the track with the track reference (tref) box 1714, the terminal checks the track reference (tref) box 1714 in step 1840.

The terminal checks the reference type (reference_type) in the track reference (tref) box 1714 in step 1850, and if its value is set as "addm" in step 1860, determining that the track is a track including the main service content 1720a, the terminal may determine which type of track the track including content other than the main service (such as an emergency message service or an advertisement) is, by checking a value of the track_ID field in the track reference (tref) box 1714 in step 1870. All steps succeeding step 1830 of checking the track (trak) boxes may be repeated from the first track to the last track of the image file.

Figure 19:
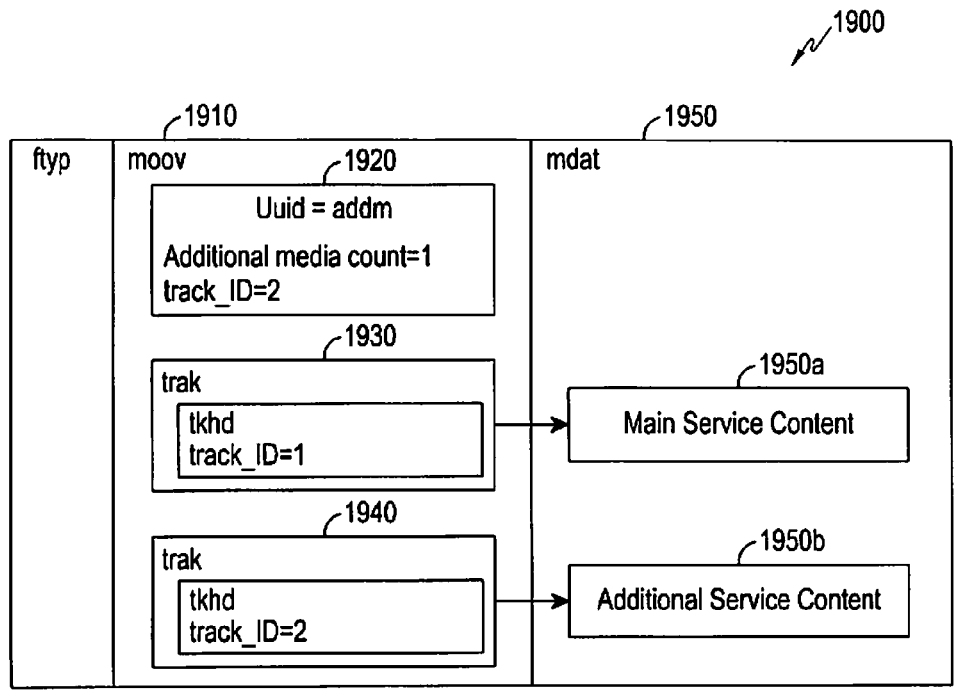
FIG. 19 is a diagram illustrating a box configuration including a new moov-level box according to an embodiment of the present invention.
Figure 20:
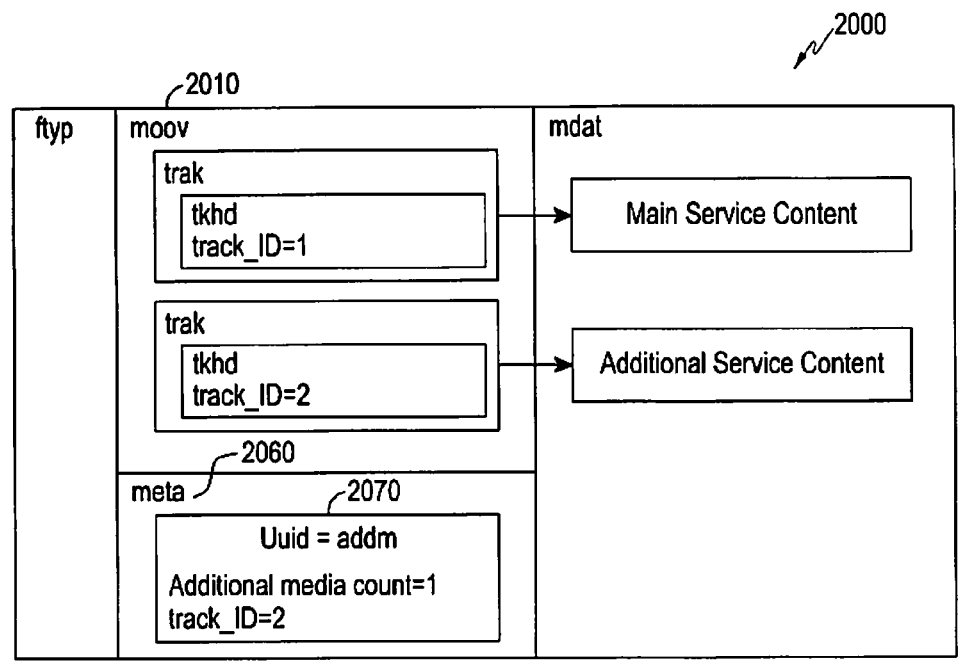
FIG. 20 is a diagram a box configuration including a new moov-level meta box according to an embodiment of the present invention.
Figure 21:
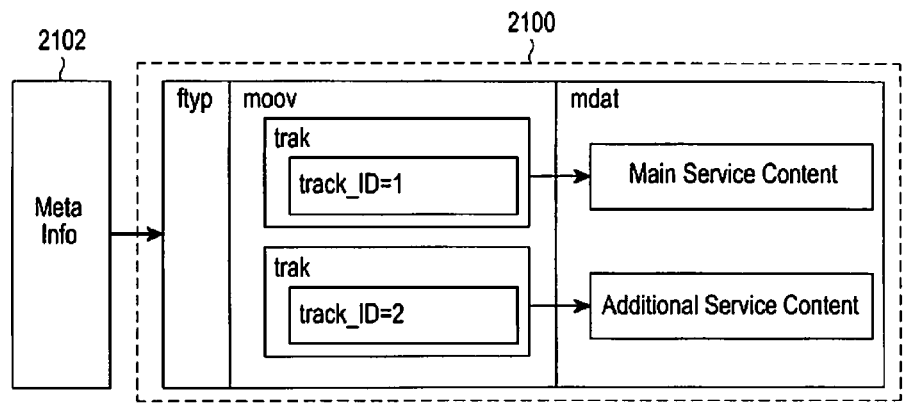
FIGS. 21 to 24 are diagrams illustrating meta information and complex content storage format that are configured separately according to an embodiment of the present invention.

Although the process of checking boxes is required in the description of operations of all terminals, the order of checking the boxes should not necessarily follow the order in the drawing. The file format analysis process and its associated terminal operation, which have not been described herein in detail, may follow details in the ISO/IEC 14496-12 standard. FIGS. 19 and 20 are diagrams illustrating box configurations including a new moov-level box and a new moov-level meta box, respectively, according to embodiments of the present invention.

Specifically, FIGS. 19 and 20 illustrate examples of new box structures 1900 and 2000 of a complex content storage format, which provide semantic configuration and role information of streams. Each of newly defined boxes 1920 and 2070 may be distinguished by defining its identifier as "uuid", and setting a value of an ID field of "uuid" as a specific value indicating that the box is a box for including information described in the present invention. Alternatively, the newly defined boxes 1920 and 2070 may be defined by setting their unique names.

Referring to FIGS. 19 and 20, the new boxes may include information indicating the number of tracks including content other than the main service, such as an emergency message service or an advertisement, and also indicating the types of tracks. The new boxes 1920 and 2070 may be configured to include information representing detailed semantic and role information of content configuration, which indicates that the tracks constitute a main service stream, an advertisement, etc.

The method proposed in the present invention may configure new boxes of the storage format in various forms such as a file-level box, a moov-level box, a track-level box, a moov-level meta box, a track-level meta box, etc., specified in the ISO-based media file format. Although not be configured in boxes as illustrated in FIGS. 15 and 17, the required information may be added in fields.

FIG. 19 illustrates an example of configuring a box including new information described herein in the form of a new moov-level box according to the second embodiment of the present invention, and FIG. 20 illustrates an example of configuring a box including new information described herein in the form of a new moov-level meta box according to the second embodiment of the present invention.

In FIG. 19, the uuid box 1920 as newly defined is defined in a MOOV box 1910, and an identifier of the uuid box 1920 is called "addm". The MOOV box 1910 includes track (trak) boxes 1930 and 1940, and the track (trak) box 1930 designates main service content 1950a with track_ID=1 in an mdat box 1950, while the track (trak) box 1940 designates additional service content 1950b with track_ID=2 in the mdat box 1950.

The uuid box 1920 includes the number of additional media content types as information indicating how many additional content types are included in the mdat box 1950. The number of additional media content types is defined in an "additional media count" field. The uuid box 1920 includes track IDs of the additional content types.

In FIG. 19, when the additional media count field included in the uuid box 1920 is set to 1, one additional content is present in the mdat box 1950, and when track_ID is set to 2, the additional content is an additional content with track_ID=2.

FIG. 20 illustrates a storage format 2000 configured by including a uuid box 2070, not in a MOOV box 2010, but in a moov-level meta box 2060.

FIGS. 21 to 27 illustrate complex content storage formats and meta information according to an embodiment of the present invention. Specifically, in FIGS. 21 to 27 illustrate the meta information including classification information and the complex content storage format including complex content and information for playing the complex content may be configured separately, or the meta information may be included in the complex content storage format.

FIGS. 21 to 24 illustrate meta information and complex content storage formats that are configured separately according to an embodiment of the present invention.

Figure 22:
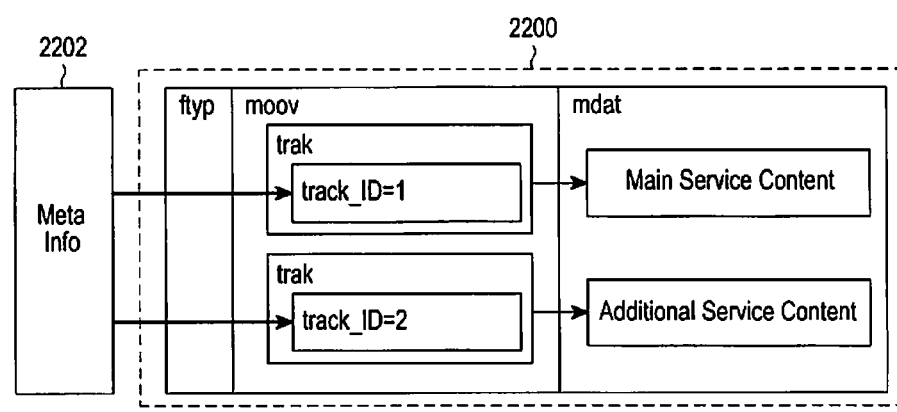
Figure 23:
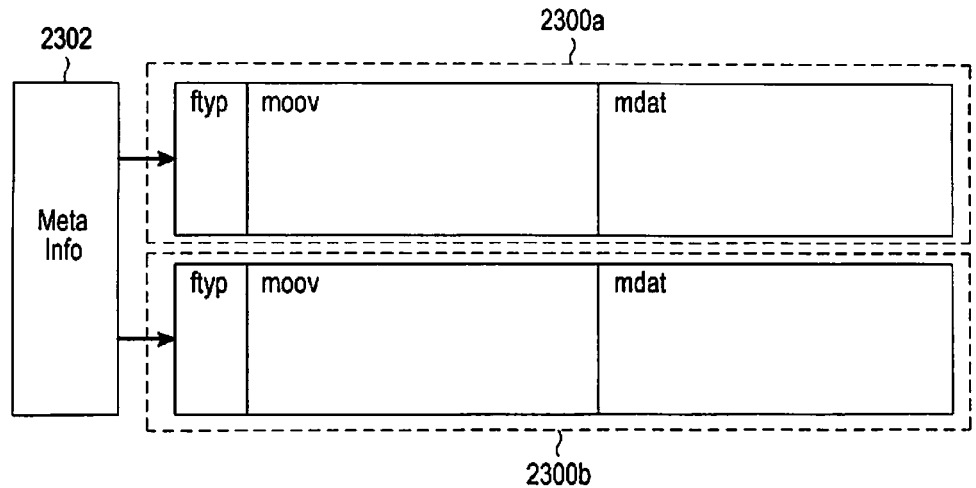
Figure 24:
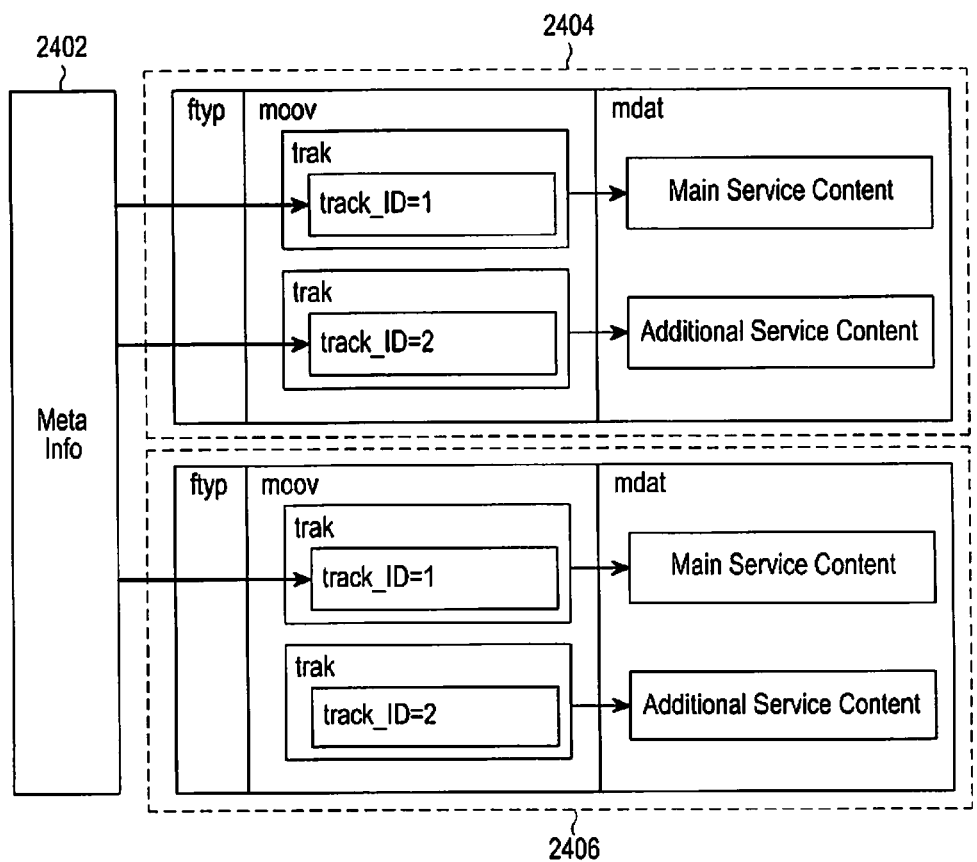

Referring to FIGS. 21 to 24, meta information or a meta information file may designate or reference the complex content storage format including actual content. For example, in FIG. 21, meta information 2102 designates a complex content storage format 2100; in FIG. 22, meta information 2202 designates a complex content storage format 2200; in FIG. 23, meta information 2302 designates complex content storage formats 2300a and 2300b; and in FIG. 24, meta information 2402 designates complex content storage formats 2404 and 2406. For example, the meta information or meta information file may be set to designate or reference detailed streams or track (trak) boxes as illustrated in FIG. 22 or 24.

Additionally, the meta information or meta information file may include related information of the complex content configured in multiple content storage formats as illustrated in FIGS. 23 and 24.

When services are configured as illustrated in FIGS. 21 to 24, a terminal checks semantic configuration and role information of content streams by analyzing a meta file, and then analyzes an actual content storage format, streams, and/or tracks.

Figure 25:
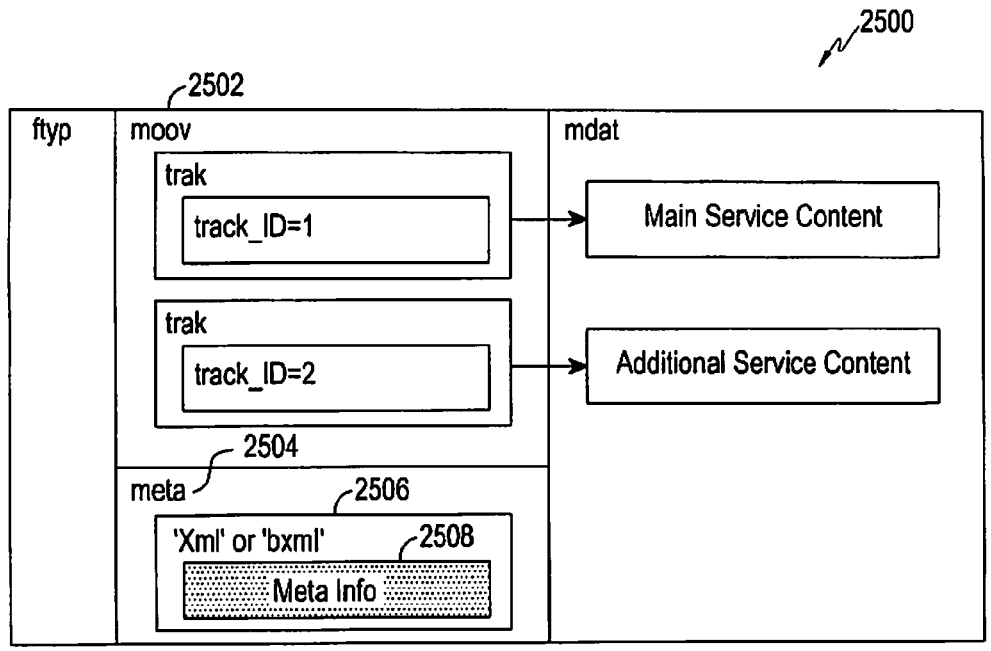
FIGS. 25 and 26 are diagrams illustrating meta information included in a complex content storage format according to an embodiment of the present invention.
Figure 26:
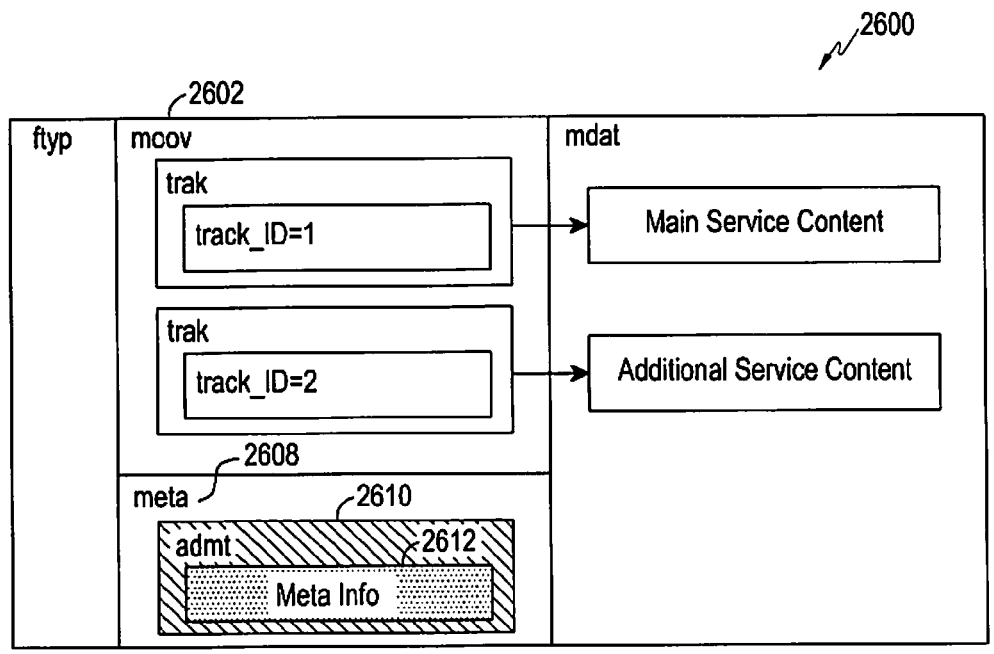

FIGS. 25 and 26 illustrate meta information included in a complex content storage format according to an embodiment of the present invention.

Specifically, FIG. 25 illustrates a complex content storage format 2500, in which a meta information file 2508 is included in an XML or binary XML (bXML) box 2506 in a meta box 2504. The meta box 2504 is in the same level as a MOOV box 2502.

FIG. 26 illustrates meta information 2612 in a complex content storage format 2600 by generating a new "admt" box 2610 including meta information in a meta box 2608. The meta box 2608 is in the same level as a MOOV box 2602.

The new boxes of the complex content storage format described above may be configured in various forms such as a file-level box, a moov-level box, a track-level box, a moov-level meta box, a track-level meta box, etc., specified in the ISO/IEC 14496-12 standard. Each of the newly defined boxes may be distinguished by defining its identifier as "uuid", and setting a value of an ID field of "uuid" as a specific value indicating that the box is for including information as described in accordance with embodiments of the present invention. Alternatively, a newly defined box may be defined by setting its unique name such as "admt", as illustrated in FIG. 26.

Figure 27:
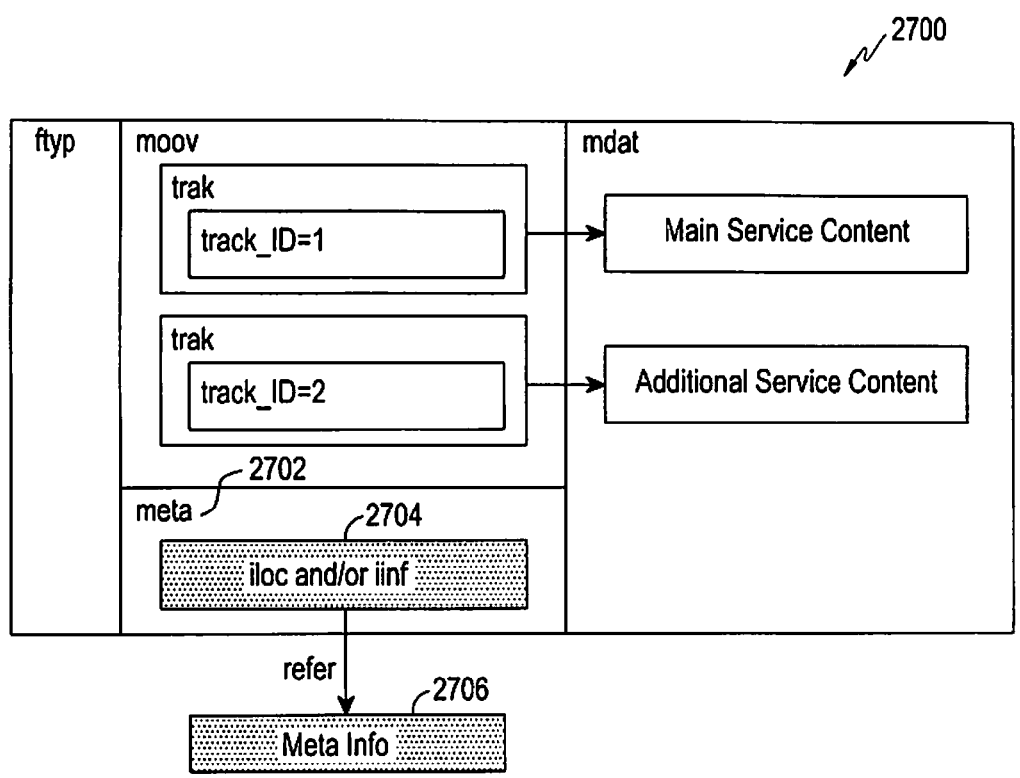
FIG. 27 is a diagram illustrating meta information including classification information and a complex content storage format that are configured separately according to an embodiment of the present invention.

FIG. 27 is a diagram illustrating meta information including classification information and a complex content storage format that are configured separately according to an embodiment of the present invention. Specifically, FIG. 27 illustrates meta information 2706 including classification information and a complex content storage format 2700 that are configured separately. However, unlike in FIGS. 21 to 24, a terminal first analyzes the complex content storage format 2700.

In this case, the terminal may check reference information for meta information or meta information file, using reference information-related boxes for the external data, content, or data source. While an item location box (iloc) and/or item information box (iinf) box 2704 of a meta box 2702 is used as a reference information-related box in FIG. 27, by way of example, other boxes can be used as reference information-related boxes in the complex content storage format 2700, such as a data information box (dinf) and/or data reference box (dref), to provide reference information for the meta information 2706 or a meta information file.

If the meta information is included in the content storage format as illustrated in FIGS. 25 and 26, the terminal may analyze in sequence a meta box, XML or bXML in a lower level of the meta box, and meta information or meta information file in order of the box level and the box configuration, through a process of analyzing the storage format according to the details of the ISO/IEC 14496-12 standard.

In the following description, if the meta information 2508 and 2612 is included in the complex content storage formats 2500 and 2600, respectively, as illustrated in FIGS. 25 and 26, the information may be analyzed according to a terminal operation in FIG. 28.

Figure 28:
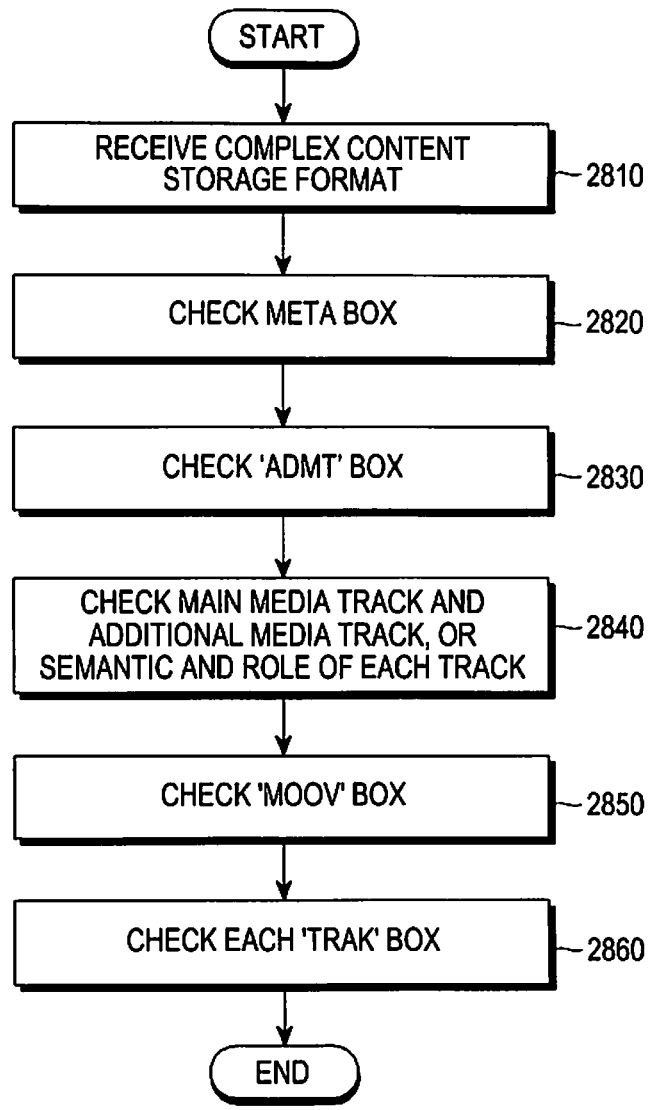
FIG. 28 is a flowchart illustrating a method of operation of a terminal receiving meta information included in a complex content storage format according to an embodiment of the present invention.

FIG. 28 is a flow chart illustrating an operational method of a terminal that receives meta information included in a complex content storage format, as illustrated in FIGS. 25 and 26, according to an embodiment of the present invention.

Referring to FIG. 28, upon receiving a content storage format in step 2810, a terminal checks a meta box in step 2820. Before step 2820 of checking a meta box, the terminal may check a file type (fytp) box in advance. Using compatibility-related information, such as brand information, in the file type (fytp) box, the terminal may determine if the complex content storage format is a content storage format including the data information or meta information box described in the present invention.

The terminal identifies meta information by checking the meta information or meta information box in step 2830, and checks a main media track and an additional media track, or semantic configuration and role of each track in step 2840. Thereafter, the terminal may check a moov box and a track (trak) box in steps 2850 and 2860, respectively.

If the meta information or meta information box is configured in a file-level box, a moov-level box, a track-level box, a moov-level meta box, or a track-level meta box, then the terminal may perform a step of analyzing an upper-level box of the relevant box, replacing step 2820.

For example, if the meta information or meta information box is configured in a moov-level box, the terminal may receive a content storage format, determine if the received content storage format is a content storage format including meta information or meta information box, check a MOOV box first, and check meta information (admt) configured in its lower level in step 2830.

Figure 29:
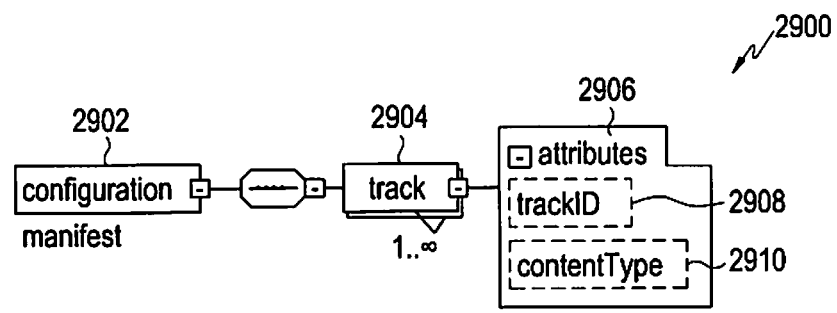
FIG. 29 is a diagram illustrating meta information according to an embodiment of the present invention.

FIG. 29 is a diagram illustrating meta information according to an embodiment of the present invention.

Referring to FIG. 29, meta information 2900 includes, as a top-level element, a content element 2902 for indicating information about which content is included in the meta information 2900, and a track element 2904, which includes information about a plurality of tracks existing in the content. For each track element 2904, an attribute field 2906 has a track ID (trackID) 2908 and a content type (contentType) 2910, which is information describing a type of the content. The content type (contentType) 2910 may provide information indicating that the content is a main service in content provision, as in the example of Table 1. Also, the content type (contentType) 2910 may provide information indicating whether the stream is a content stream for an emergency message service or a stream for an advertisement, as in the example of Table 2.

The track element 2904 in FIG. 29 may be replaced by information indicating information about the stream or content. For example, if the track is replaced by content, a service provided may include content A, content B, and content C, and attribute information of the content type (contentType) 2910 may provide information describing a semantic or a role of each of the content A, the content B, and the content C in providing complex content.

Figure 30:
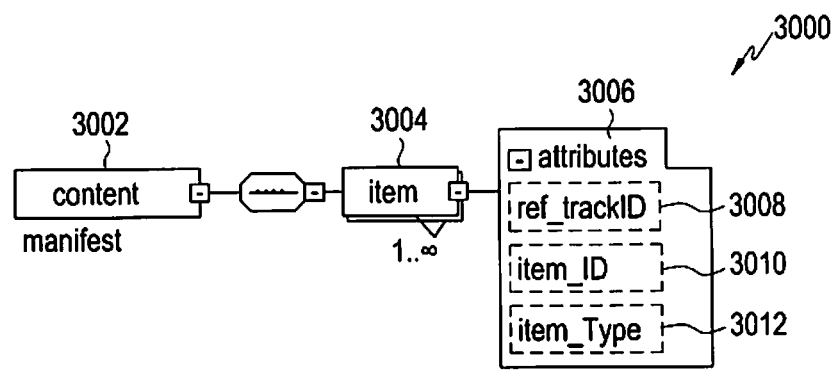
FIG. 30 is a diagram illustrating meta information provided in a unit of an "item", whose semantic configuration and role information is a logical configuration unit, according to an embodiment of the present invention.

FIG. 30 illustrates meta information provided in a unit of an "item", whose semantic configuration and role information is a logical configuration unit, according to an embodiment of the present invention.

Referring to FIG. 30, the meta information 3000 includes a content element 3002 indicating information about which content is included in the meta information 3000, and an item element 3004, which includes information about the items existing in the content. For each item element 3004, an attribute field 3006 has a reference track identifier (ref trackID) 3008, an item identifier (item_ID) 3010, and an item type (item_Type) 3012, which is information describing a type of the item 3004.

The item_Type 3012 is attribute information providing the same information as the contentType 2910 in FIG. 29. The item 3004 is a logical structure. Physically, the item 3004 may include a plurality of tracks/streams/content, and several items may constitute one track/stream/content.

Figure 31:
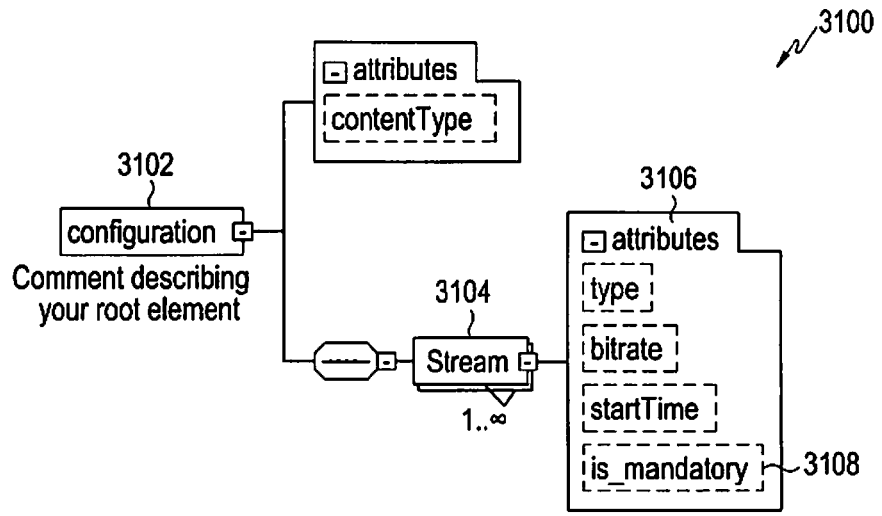
FIGS. 31 and 32 are diagrams illustrating meta information according to an embodiment of the present invention.
Figure 32:
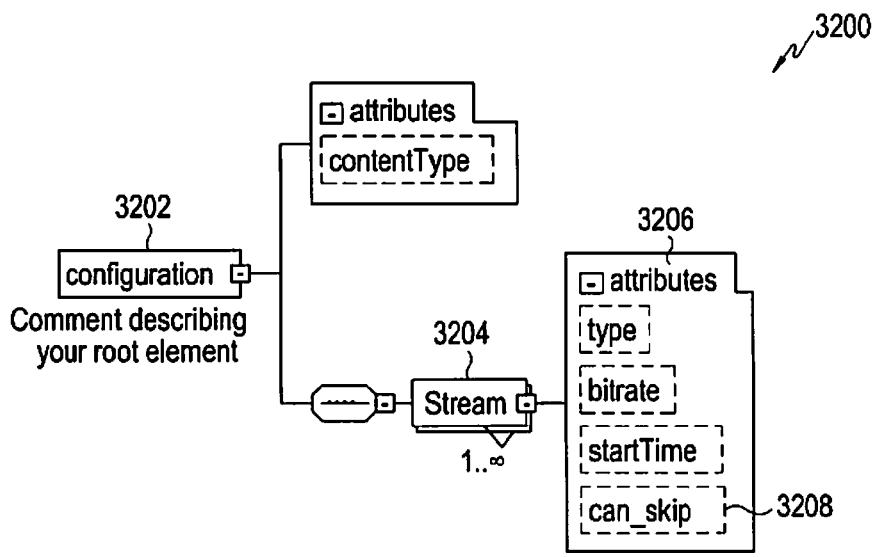

FIGS. 31 and 32 illustrate meta information according to embodiments of the present invention. Specifically, in FIGS. 31 and 32, semantic configuration and role information of content may be provided by offering a specific method for providing content using meta information 3100 and 3200.

Referring to FIG. 31, a terminal may determine whether the track/stream/content is set for mandatory provision, by checking a value of an is_mandatory element 3108 in an attribute field 3106 of a stream element 3104, which is a lower-level element of a top-level 'configuration' element 3102 of the meta information 3100. The is_mandatory element 3108 is mandatory provision attribute information indicating whether the track/stream/content must be provided, or is provided for an additional service. Based on this attribute information, the terminal may determine whether the track/stream/content is for a main service, or for an additional service such as an advertisement. If a value of the is_mandatory element, or the mandatory provision attribute information, is set as "true", it indicates that the track/stream/content is for a main service. However, if a value of the is_mandatory element is set as "false", it indicates that the track/stream/content is for an additional service.

Referring to FIG. 32, a terminal may determine whether the track/stream/content can be skipped, by checking a value of a "can_skip" element 3208 or "skip" attribute information in an attribute field 3206 of a lower-level stream element 3204 of a top-level configuration element 3203 of the meta information 3200. If a value of the can_skip element 3208 or the skip attribute information is set as "true", the terminal may determine that the track/stream/content corresponds to an additional service that can be skipped. However, if a value of the can_skip element 3208 is set as "false", the terminal may determine that the track/stream/content corresponds to a main service that cannot be skipped. Based on this attribute information, the terminal may determine whether the track/stream/content is for a main service, or for an additional service such as an advertisement.

The information about the content providing method of FIGS. 31 and 32 may be further provided as additional information, together with configuration information and meta information, as in above-described embodiments of the present invention. For example, after a terminal has determined that the track/stream/content is for a main service, if a value of the can_skip attribute field of the track/stream/content is set as "true", then the terminal may lower priority of the main service being provided, such as stopping the main service and providing another service.

The information about the content providing method of FIGS. 31 and 32 may be used to reflect opinions of content providers or service providers in providing service content, or to reflect terminal settings or user preferences in providing service content. This information may further include information reflecting opinions of content providers or service providers in providing service content, or may further include information reflecting terminal settings or user preferences in providing service content.

The meta information described herein may change a content provision method, a content display method, or a content storage method according to the semantic configuration and role information of content, or may further provide information about the content provision method, the content display method, or the content storage method according to the semantic configuration and role information of content.

As an example of the content display method, information for determining whether to provide data of streams 1 and 2 simultaneously, or whether to provide the stream 2 in the middle of the stream 1, may be further added, and the content provision method may be determined based on the meta information described in the present invention.

As another example of the content display method, for video content, detailed information as shown in Table 4 may be provided by providing new attribute information for layout information, and the content provision method may be determined by checking the meta information described in the third embodiment.

TABLE 4

| value | layout type |
|---|---|
| 0x01 | layering |
| 0x02 | picture in picture |
| 0x03 | pop-up |
| 0x04~ | reserved |

As another example of the content display method, for audio content, unlike video content, if two different audio streams are played simultaneously, normal audio services may not be provided. While a service such as an advertisement is being provided according to the semantic configurations and roles of content, detailed service provision-related attribute information, such as reducing the volume for the main media, muting the main media, and skipping data of the main service, may also be provided as meta information. Also, the content provision method may be determined by checking the configuration information and meta information including the above-described semantic configuration and role information of content.

Additionally, the content stored in a receiving terminal may be controlled according to the configuration information and meta information including the above-described semantic configuration and role information of content. After undergoing a content provision process such as playing service content by checking configuration information and meta information including the semantic configurations and roles of content, the receiving terminal may select and store the content/stream/track according to the configuration information and meta information including the semantic configurations and roles of content.

For example, if complex content includes a stream 1, a stream 2, and a stream 3 as its main service content, and a stream 4 and a stream 5 as advertisement service content, stream 1, stream 2, and stream 3 are stored as main service content in a storage of the receiving terminal, and then configured in a separate media file and managed.

While a single media file is transmitted in the foregoing description, one file including a stream 1, a stream 2, and a stream 3 constituting the main service content and another file including a stream 4 and a stream 5 constituting the advertisement service content may be stored and managed as separate content files independently according to the configuration information and meta information including the semantic configurations and roles of content.

Figure 33:
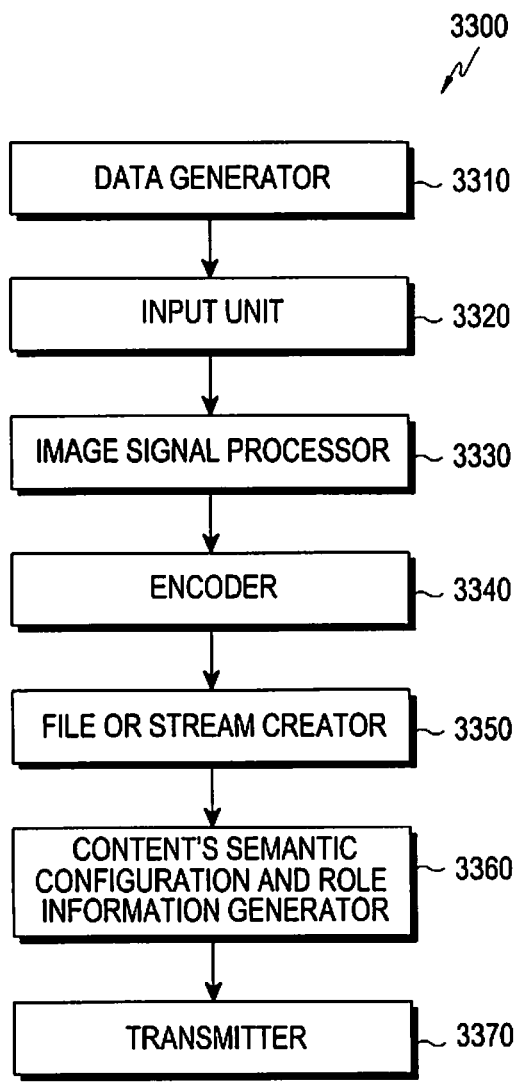
FIG. 33 is a block diagram illustrating a complex content file transmission apparatus according to an embodiment of the present invention.

FIG. 33 is a block diagram of a complex content file transmission apparatus according to an embodiment of the present invention.

Referring to FIG. 33, the complex content file transmission apparatus 3300, such as a server apparatus 500, as illustrated in FIG. 5, includes a data generator 3310, an input unit 3320, an image signal processor 3330, an encoder 3340, a file/stream creator 3350, a content semantic configuration and role information generator 3360, and a transmitter 3370.

The data generator 3310 generates raw data such as texts, videos, audios, graphics, and metadata capable of constituting content, including image generation devices (e.g., camera and camcorder), acoustic devices, and text generators. Data output from the data generator 3310 is input to the input unit 3320. The input unit 3320 provides the data received from the data generator 3310 to the image signal processor 3330, in which the data output from the input unit 3320 undergoes preprocessing. The preprocessing may include all operations of converting an input image from analog to digital, and transforming input data using necessary external input values to provide the image data.

The data preprocessed by the image signal processor 3330 is output to the encoder 3340. Although a storage structure for buffering is not illustrated separately between the components shown in FIG. 33, the storage structure may be provided depending on the generation devices, systems, and data generation methods. The encoder 3340 encodes the data provided from the image signal processor 3330. The encoding operation of the encoder 3340 is optional. Additionally, if beneficial for a specific design, two or more encoders 3340 may be provided, making it possible to provide different types or classes of services.

The file/stream creator 3350 creates content files or data streams from the data encoded by the encoder 3340 according to the transmission format or unit, and outputs them to the content semantic configuration and role information generator 3360. The content semantic configuration and role information generator 3360 generates semantic configuration and role information of content files according to an embodiment of the present invention. If a complex content file is configured to include the semantic configuration and role information of a content file, the file/stream creator 3350 may generate semantic configuration and role information of a content file. The semantic configuration and role information of a content file may be generated by a separate data generator and transmitted to a receiving terminal, when the file created by the file/stream creator 3350 is transmitted.

The content semantic configuration and role information generator 3360 generates information about relationships between and roles of the contents included in the complex content according to exemplary embodiments of the present invention. The information about relationships between and roles of the contents may be included in classification information for classifying the contents. The data generator 3310, the input unit 3320, the image signal processor 3330, the encoder 3340, the file/stream creator 3350, and the content semantic configuration and role information generator 3360 may be included in a data processor 502, as illustrated in FIG. 5.

Figure 34:
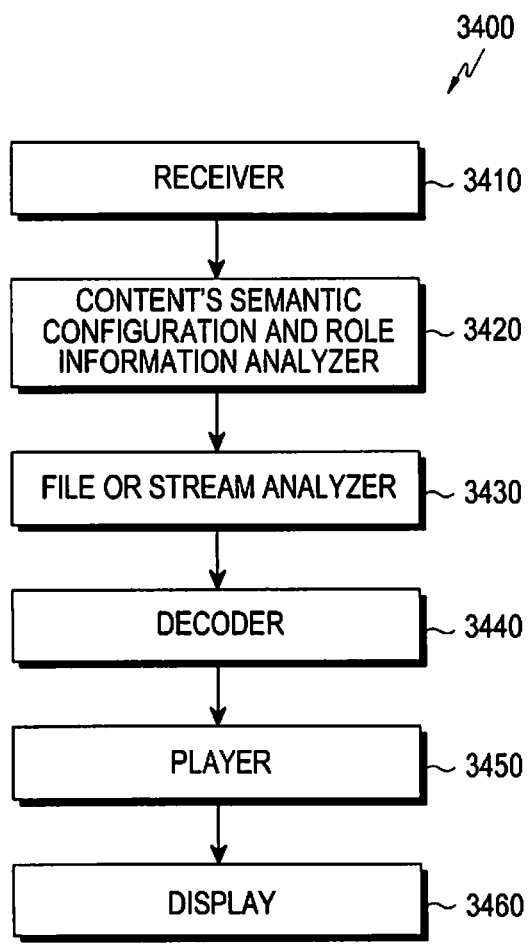
FIG. 34 is a block diagram illustrating a complex content file reception apparatus according to an embodiment of the present invention.

FIG. 34 is a block diagram illustrating a complex content file reception apparatus according to an embodiment of the present invention.

Referring to FIG. 34, the complex content file reception apparatus 3400, such as client apparatus 600, as illustrated in FIG. 6, includes a receiver 3410 for receiving complex content files from a server, a content semantic configuration and role information analyzer 3420, a file/stream analyzer 3430, a decoder 3440, a player 3450, and a display 3460. The content semantic configuration and role information analyzer 3420 receives and analyzes the information generated by the content semantic configuration and role information generator 3360 in FIG. 33. The file/stream analyzer 3430 analyzes the file created by and received from the file/stream creator 3350 in FIG. 533.

If a complex content file is configured to include the content semantic configuration and role information, the file/stream analyzer 3430 may include a process of analyzing the content semantic configuration and role information. The decoder 3440 decodes the content data analyzed and extracted by the file/stream analyzer 3430. The decoding process is performed, when the complex content file transmission apparatus 3300 encodes the file/stream using the encoder 3340. The data encoded by more than one encoder, may be decoded by their associated decoder, or may be decoded selectively depending on the systems or terminals, making it possible to provide different types/classes of services.

Although a separate storage is not illustrated in FIG. 34, a storage for buffering or storing data may be provided between the components illustrated in FIG. 34.

The player 3450 plays the data provided from the decoder 3440 depending on the information analyzed by the content semantic configuration and role information analyzer 3420 and the file/stream analyzer 3430. The display 3460 displays the content played by the player 3450. This display 3460 refers to a final output device, or a physical output device, by which actual data is output and provided to the user. The content semantic configuration and role information analyzer 3420, the file/stream analyzer 3430, the decoder 3440, and the player 3450 may be included in a processor 604, as illustrated in FIG. 6.

The information described in embodiments of the present invention and used to classify contents included in complex content is called 'classification information'. For example, the classification information may include 'stream_type'; 'is_mainStream'; reference_type and track_ID included in a track reference (tref) box; 'additional media count' and track_ID included in a meta box or metadata; and 'content_type', 'item_Type', 'is_mandatory', and 'can_skip'.

The foregoing details of the above-described embodiments of the present invention are subject to change according to the system or service environments. For example, upon checking storage format configuration information for real-time services, a terminal may determine that an advertisement, which has not been received at a terminal but is to be provided in the future, will be received in data of an additional media track. When services are provided in real time or an unexpected emergency message is created, to provide the above-described content semantic configuration and role information, a process of updating and delivering configuration information, or retransmitting and re-receiving the configuration information may be performed.

As is apparent from the above-described embodiments of the present invention, in providing complex content including multiple source contents or streams, information about semantic configurations and roles of various source streams constituting the complex content is proved, thereby making it possible to utilize the content according to various content types and user intentions. Such content may be provided as user-adaptive content.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for transmitting complex content including a plurality of content, comprising:
    creating the complex content including the plurality of content;
    identifying configuration information for the plurality of content;
    generating classification information corresponding to the complex content, based on the configuration information for the plurality of content, wherein the generated classification information indicates whether each of the plurality of content is main or additional content and comprises mandatory provision attribute information which identifies content required to be played from among the plurality of content; and
    transmitting, to a reception apparatus, the complex content and the classification information corresponding to the complex content,
    wherein the configuration information is for at least one of providing information for a service, setting for the service, and initializing for the service, and
    wherein transmitting the classification information includes providing the classification information using a configuration file and the classification information includes stream type information included in a lower-level attribute field of the configuration file, the stream type information used to indicate whether each of the plurality of content is the main or additional content information.

2. The method of claim 1, wherein transmitting the classification information includes providing the classification information further configured using at least one of, a movie meta data (MOOV) box, a meta box, and meta information.

3. The method of claim 2, wherein, when provided using the MOOV box, the classification information includes a reference type and a track identifier included in a track reference (tref) box included in one of a plurality of track (trak) boxes included in the MOOV box.

4. The method of claim 2, wherein, when provided by the MOOV box, the classification information includes a number of additional service content types included in the plurality of content and a track identifier for identifying each of the plurality of content.

5. The method of claim 2, wherein, when provided using the meta box, the classification information includes a number of additional service content types included in the plurality of content and a track identifier for identifying each of the plurality of content.

6. The method of claim 2, wherein the classification information includes skip attribute information for identifying content that may be skipped by a user from among the plurality of content.

7. An apparatus for transmitting complex content including a plurality of content, comprising:
    a data processor for creating the complex content including the plurality of content, identifying configuration information for the plurality of content, and generating classification information corresponding to the complex content, based on the configuration information for the plurality of content;

a transmitter for transmitting, to a reception apparatus, the complex content and the classification information corresponding to the complex content; and wherein the generated classification information indicates whether each of the plurality of content is main or additional content and comprises mandatory provision attribute information which identifies content required to be played from among the plurality of content, and wherein the configuration information is for at least one of providing information for a service, setting for the service, and initializing for the service, and wherein the classification information comprises a configuration file, and the configuration file comprises stream type information included in a lower-level attribute field the stream type information used to indicate whether each of the plurality of content is the main or addition content information.

8. The apparatus of claim 7, wherein the classification information comprises at least one of:
a movie meta data (MOOV) box;
a meta box; and
meta information.

9. The apparatus of claim 8, wherein the MOOV box comprises a reference type and a track identifier included in a track reference (tref) box included in one of a plurality of track (trak) boxes.

10. The apparatus of claim 8, wherein the MOOV box comprises:
a number of additional service content types included in the plurality of content; and
a track identifier for identifying each of the plurality of content.

11. The apparatus of claim 8, wherein the meta box comprises:
a number of additional service content types included in the plurality of content; and
a track identifier for identifying the plurality of content.

12. The apparatus of claim 8, wherein the classification information comprises skip attribute information for distinguishing content that may be skipped by a user from among the plurality of content.

13. The method of claim 1, wherein the additional content comprises one of an advertisement, a user-defined category of content, and an emergency broadcast or message.

14. The apparatus of claim 7, wherein the additional content comprises one of an advertisement, a user-defined category of content, and an emergency broadcast or message.

* * * * *